(12) United States Patent
Choi et al.

(10) Patent No.: US 11,941,666 B2
(45) Date of Patent: Mar. 26, 2024

(54) SYSTEM AND METHOD FOR AUTOMATIC MATCHING SEARCH ADVERTISEMENT BASED ON PRODUCT PRELIMINARY CLASS

(71) Applicant: NHN Corporation, Seongnam-si (KR)

(72) Inventors: Bowoo Choi, Seongnam-si (KR); Ji Hyun Sung, Seongnam-si (KR); Kirin Choi, Seongnam-si (KR)

(73) Assignee: NHN CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/542,396

(22) Filed: Dec. 4, 2021

(65) Prior Publication Data

US 2022/0180404 A1 Jun. 9, 2022

(30) Foreign Application Priority Data

Dec. 9, 2020 (KR) .......................... 10-2020-0171143

(51) Int. Cl.
  *G06Q 30/0273* (2023.01)
  *G06F 16/953* (2019.01)
  *G06Q 30/0241* (2023.01)

(52) U.S. Cl.
  CPC ....... *G06Q 30/0275* (2013.01); *G06F 16/953* (2019.01); *G06Q 30/0277* (2013.01)

(58) Field of Classification Search
  CPC ............ G06Q 30/0275; G06Q 30/0277; G06F 16/953; G06F 16/9538

(Continued)

(56) References Cited

U.S. PATENT DOCUMENTS

| 7,996,753 B1* | 8/2011 | Chan .................. G06Q 30/0263 715/234 |
| 2004/0030421 A1* | 2/2004 | Haley .................... G06N 5/025 706/45 |

(Continued)

FOREIGN PATENT DOCUMENTS

| KR | 10-0839831 | 6/2008 |
| KR | 10-2010-0043823 | 4/2010 |

(Continued)

OTHER PUBLICATIONS

Ashlee Humpherys, Construal Matching in Online Search: Applying Text Analysis to Illuminate the Consumer Decision Journey, 2020 (Year: 2020).*

*Primary Examiner* — Tarek Elchanti
(74) *Attorney, Agent, or Firm* — Ladas & Parry, LLP

(57) ABSTRACT

A system for automatic matching search advertisement based on a product includes an advertising server configured to be accessible by at least one affiliate server and provide the affiliate server with a product-based automatic matching advertising interface, a text analysis apparatus configured to generate at least one text-based product attribute value corresponding to selected product advertising information by analyzing text information corresponding to the product advertising information selected by the affiliate server while operating in conjunction with the advertising server and to provide the at least one text-based product attribute value, and at least one user terminal having a product search application provided by the advertising server and installed therein, and connected to the advertising server over a network.

18 Claims, 10 Drawing Sheets

(58) Field of Classification Search
USPC ....... 705/17.71; 714/234; 707/711; 715/835; 706/45
See application file for complete search history.

(56) References Cited

U.S. PATENT DOCUMENTS

| | | | | |
|---|---|---|---|---|
| 2007/0112764 | A1* | 5/2007 | Yih | G06F 16/313 707/999.005 |
| 2007/0213974 | A1* | 9/2007 | Xu | G06F 40/268 704/9 |
| 2010/0268600 | A1* | 10/2010 | Banko | G06Q 30/0254 705/14.52 |
| 2010/0299199 | A1* | 11/2010 | Kang | G06F 16/48 704/235 |
| 2011/0225038 | A1* | 9/2011 | Fontoura | G06Q 30/02 707/711 |
| 2011/0238495 | A1* | 9/2011 | Kang | G06Q 30/0251 705/14.49 |
| 2011/0264526 | A1* | 10/2011 | Mital | G06Q 30/0603 707/706 |
| 2012/0059722 | A1* | 3/2012 | Rao | G06Q 30/0277 705/14.69 |
| 2015/0213481 | A1* | 7/2015 | Yuan | G06Q 30/0244 707/E17.014 |
| 2015/0254714 | A1* | 9/2015 | Zhuang | G06F 16/951 705/14.54 |
| 2015/0286371 | A1* | 10/2015 | Degani | H04L 51/046 715/835 |
| 2018/0011937 | A1* | 1/2018 | Tikhonov | G06F 16/9536 |

FOREIGN PATENT DOCUMENTS

| | | |
|---|---|---|
| KR | 10-2013-0107040 | 10/2013 |
| KR | 10-1526941 | 6/2015 |
| KR | 10-1870938 | 6/2018 |
| KR | 10-2019-0055963 | 5/2019 |
| KR | 10-2148451 | 8/2020 |

\* cited by examiner

FIG. 6

Dress Forum | On-time Shipping 91.06% ★★★★★ (89)

Cheetah Ruffled Mini Skirt

FS4861

$14.50

PRODUCT DETAIL | ORDER INFO

Cheetah print mini skirt featuring a flowy ruffled hem and short lining. Model is 5'8" and wearing size Small.

FIG. 8

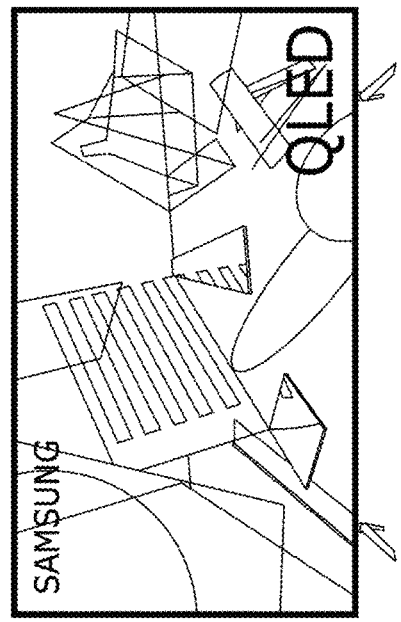

912

SAMSUNG Q60T Series 55-inch Class QLED Smart TV | 4K, UHD Dual LED Quantum HDR | Alexa Built-in | QN55Q60TAFXZA, 2020...

★★★★☆ 917

$697.99  $749.99 (7% off)

- Your purchase includes One Samsung 55-Inch Class QLED Smart TV | TM2050A remote with batteries, power cable & user manual | HDMI cable not included
- TV Dimensions: With stand - 48.4" W x 30.9" H x 9.6" D | W/O stand - 48.4" W x 27.8" H x 2.3" D | Screen size - 54.6" | Power Supply (V) - AC110-120V 50/60Hz | WiFi & Bluetooth enabled ∨ Show more

920

Advertising unit price : $0,000

SYSTEM AND METHOD FOR AUTOMATIC MATCHING SEARCH ADVERTISEMENT BASED ON PRODUCT PRELIMINARY CLASS

CROSS REFERENCE TO RELATED APPLICATION

This application claims priority from and benefit of Korean Patent Application No. 10-2020-0171143, filed on Dec. 9, 2020, which is hereby incorporated by reference for all purposes as if fully set forth herein.

BACKGROUND

1. Technical Field

Embodiments of the present disclosure generally relate to an advertising system, and particularly, to an automatic matching search advertising system and method based on a product.

2. Related Art

With a sudden increase in Internet users, users who purchase products through online shopping malls tend to rapidly increase. The purchase of products through the online shopping malls has an advantage in that a user can buy a desired product rapidly and conveniently at home or in a company by searching for the product even without actually visiting an offline or onsite store.

Accordingly, advertisers who want to sell products want to advertise contents corresponding to selling products to be more efficiently exposed to consumers online, that is, online users. In a conventional technology, an online advertising system, which connects a selling product to a search keyword frequently used by a consumer, is commonly used. For example, an advertising system, which displays, to a consumer, product advertising information connected to a specific search keyword as the results of search when the consumer uses the search keyword, is widely used.

However, although a specific search keyword is used a lot by a user, if actual association or relevance between the search keyword and a selling product connected to the search keyword is low, the user is highly likely not to be interested in, or click on, the advertising of the selling product. Accordingly, an advertising system using such a method may not be efficient on the part of an advertiser.

Furthermore, the existing product purchase through online shopping malls has a disadvantage in that it is not possible for a user to buy a product after actually watching the product. In order to overcome such a disadvantage, online shopping has recently been in the spotlight, which uses an image search tool for searching for products associated with a product image when a user inputs the product image.

SUMMARY

Various embodiments are directed to providing an automatic matching search advertising system and method based on a product, in which when an affiliate server (or an advertiser server) connected to an advertising server selects a specific advertising product among pieces of product advertising information provided by the advertising server, a selected advertisement is preferentially provided to a consumer based on a condition that text-based attribute values extracted from information of a product selected by an advertiser are matched with a search keyword and/or a search image inputted by a user who accesses an online shopping mall, etc.

In an embodiment, an automatic matching search advertising system based on a product may include an advertising server accessed by at least one affiliate server and configured to provide the affiliate server with a product-based automatic matching advertising interface, a text analysis apparatus configured to generate at least one text-based product attribute value corresponding to selected product advertising information by analyzing text information corresponding to an image of the product advertising information selected by the affiliate server while operating in conjunction with the advertising server and to provide the at least one text-based product attribute value, at least one user terminal having a product search application provided by the advertising server and installed therein, and connected to the advertising server over a network. The product-based automatic matching advertising interface may include a product advertising database display unit which displays pieces of product advertising information stored in a database of the advertising server, and a unit price input unit through which an advertising bidding price of the selected advertising product is able to be written.

The advertising server may determine whether to advertise the at least one selected product advertising information based on an advertising bidding price of at least one selected advertising product inputted by the at least one affiliate server.

The advertising server may determine an advertising order of a plurality of pieces of product advertising information selected by a plurality of affiliate servers by comparing and analyzing a plurality of advertising bidding prices inputted by the plurality of affiliate servers.

The advertising server may receive first product advertising information selected by a first affiliate server among the plurality of affiliate servers and a first advertising bidding price of the first product advertising information and second product advertising information selected by a second affiliate server and a second advertising bidding price of the second product advertising information, and may preferentially advertise the first product advertising information of the first affiliate server when the first product advertising information and the second product advertising information correspond to products belonging to an identical category and the first advertising bidding price is higher than the second advertising bidding price.

The advertising server may include a product-based automatic matching advertising interface provision unit configured to provide the product-based automatic matching advertising interface to the at least one affiliate server, a selected advertising information/advertising unit price input reception unit configured to receive information inputted through the product-based automatic matching advertising interface and provide the received information to the text analysis apparatus, a product attribute value storage unit configured to store, in the database, the text-based product attribute values extracted by the text analysis apparatus, and an advertising provision unit configured to compare a search keyword inputted through the product search application of the user terminal and the product attribute value of the selected product advertising information and preferentially advertise the selected product advertising information having a product attribute value matched with the search keyword.

Preferentially advertising the selected product advertising information may include exposing the selected product advertising information onto the first page of a search result display screen of the product search application of the user terminal.

The information inputted through the product-based automatic matching advertising interface may include the product advertising information selected by the affiliate server and the advertising bidding price of the selected advertising information.

The text analysis apparatus may include a metadata input unit configured to receive, as metadata, text information corresponding to an image of the selected product advertising information, and a machine learning algorithm execution unit configured to generate a product attribute value corresponding to the selected product advertising information by analyzing the metadata and provide the product attribute value.

The database of the advertising server may include a first database in which product images of the respective pieces of product advertising information are stored, and a second database in which attribute values of products corresponding to the images for each product are stored.

The machine learning algorithm execution unit may include a morpheme analysis unit configured to analyze, in a morpheme unit, the pieces of text information inputted as the metadata and inputted in the form of a sentence or a combination of a plurality of words, and a product information extraction unit configured to extract, from a plurality of morphemes, pieces of feature information of a product corresponding to a corresponding product image by analyzing the plurality of morphemes, and may generate product attribute values corresponding to each product by comparing the pieces of feature information of the product with product attribute values previously set and stored in the second database and converting the pieces of feature information into product attribute values matched with the feature information.

The product attribute value generation/provision unit may convert the feature information into the product attribute value matched with the feature information by using a synonymous word database for vendor names or product names corresponding to the products and an abbreviation, synonym and conjugation database for the products for each category.

In an embodiment, an automatic matching search advertising method based on a product may include providing a product-based automatic matching advertising interface to at least one affiliate server, receiving at least one product advertising information selected by the affiliate server through the product-based automatic matching advertising interface, receiving, as metadata, text information corresponding to an image of the selected product advertising information and extracting a text-based product attribute value corresponding to the selected product advertising information by analyzing the metadata, storing the extracted text-based product attribute values in a database, and comparing a search keyword inputted through a product search application of a user terminal and the product attribute value of the selected product advertising information and preferentially advertising the selected product advertising information having a product attribute value matched with the search keyword.

The preferentially advertising of the selected product advertising information may include exposing the selected product advertising information onto the first page of a search result display screen of the product search application of the user terminal.

The product-based automatic matching advertising interface may include a product advertising database display unit which displays pieces of product advertising information stored in the database, and a unit price input unit through which an advertising bidding price of the selected advertising product is able to be written.

The information inputted through the product-based automatic matching advertising interface may include the product advertising information selected by the affiliate server and the advertising bidding price of the selected advertising information.

The automatic matching search advertising method may further include determining whether to advertise the selected product advertising information based on an advertising bidding price of the selected advertising product inputted by the affiliate server.

The extracting of the text-based product attribute value corresponding to the selected product advertising information may include a step of receiving, as metadata, text information corresponding to an image of the selected product advertising information, and a machine learning algorithm execution step of generating the product attribute value corresponding to the selected product advertising information by analyzing the metadata and providing the product attribute value.

The database may include a first database in which product images of the respective pieces of product advertising information are stored, and a second database in which attribute values of products corresponding to the images for each product are stored.

The machine learning algorithm execution step may include a morpheme analysis step of analyzing, in a morpheme unit, the pieces of text information inputted as the metadata and inputted in the form of a sentence or a combination of a plurality of words, a product information extraction step of extracting, from a plurality of morphemes, pieces of feature information of a product corresponding to a corresponding product image by analyzing the plurality of morphemes, and a product attribute value generation/provision step of generating product attribute values corresponding to each product by comparing the pieces of feature information of the product with product attribute values previously set and stored in the second database and converting the pieces of feature information into product attribute values matched with the feature information.

The product attribute value generation/provision step may include converting the feature information into the product attribute value matched with the feature information by using a synonymous word database for vendor names or product names corresponding to the products and an abbreviation, synonym and conjugation database for the products for each category.

The automatic matching search advertising method may further include determining an advertising order of a plurality of pieces of product advertising information selected by a plurality of affiliate servers by comparing and analyzing a plurality of advertising bidding prices inputted by the plurality of affiliate servers.

The determining of the advertising order of the plurality of pieces of product advertising information selected may include receiving first product advertising information selected by a first affiliate server among the plurality of affiliate servers and a first advertising bidding price of the first product advertising information and second product advertising information selected by a second affiliate server and a second advertising bidding price of the second product advertising information, and preferentially advertising the first product advertising information of the first affiliate server when the first product advertising information and the second product advertising information correspond to products belonging to an identical category and the first advertising bidding price is higher than the second advertising bidding price.

According to some embodiments of the present disclosure described above, optimal advertising suitable for the needs of a final consumer can be more efficiently performed by preferentially providing a selected advertisement to the consumer based on a condition that text-based attribute values extracted from information of a product selected by an advertiser are matched with a search keyword and/or a search image inputted by a user who accesses an online shopping mall, etc. when the affiliate server (or the advertiser server) accessing an advertising server selects a specific advertising product among pieces of product advertising information provided by the advertising server.

Furthermore, according to certain embodiments of the present disclosure, optimal advertising efficiency can be achieved in a way that an advertiser selects a specific product among pieces of product advertising information provided by the advertising server and provides only advertising bidding price information of the selected product.

BRIEF DESCRIPTION OF THE DRAWINGS

FIG. 6 is a diagram describing an example in which product attribute values are extracted from text information of a selected advertising product.

FIGS. 8 and 9 are diagrams describing an operation of advertising a product using a product-based automatic matching advertising interface according to an embodiment of the present disclosure.

DETAILED DESCRIPTION

Figure 1:
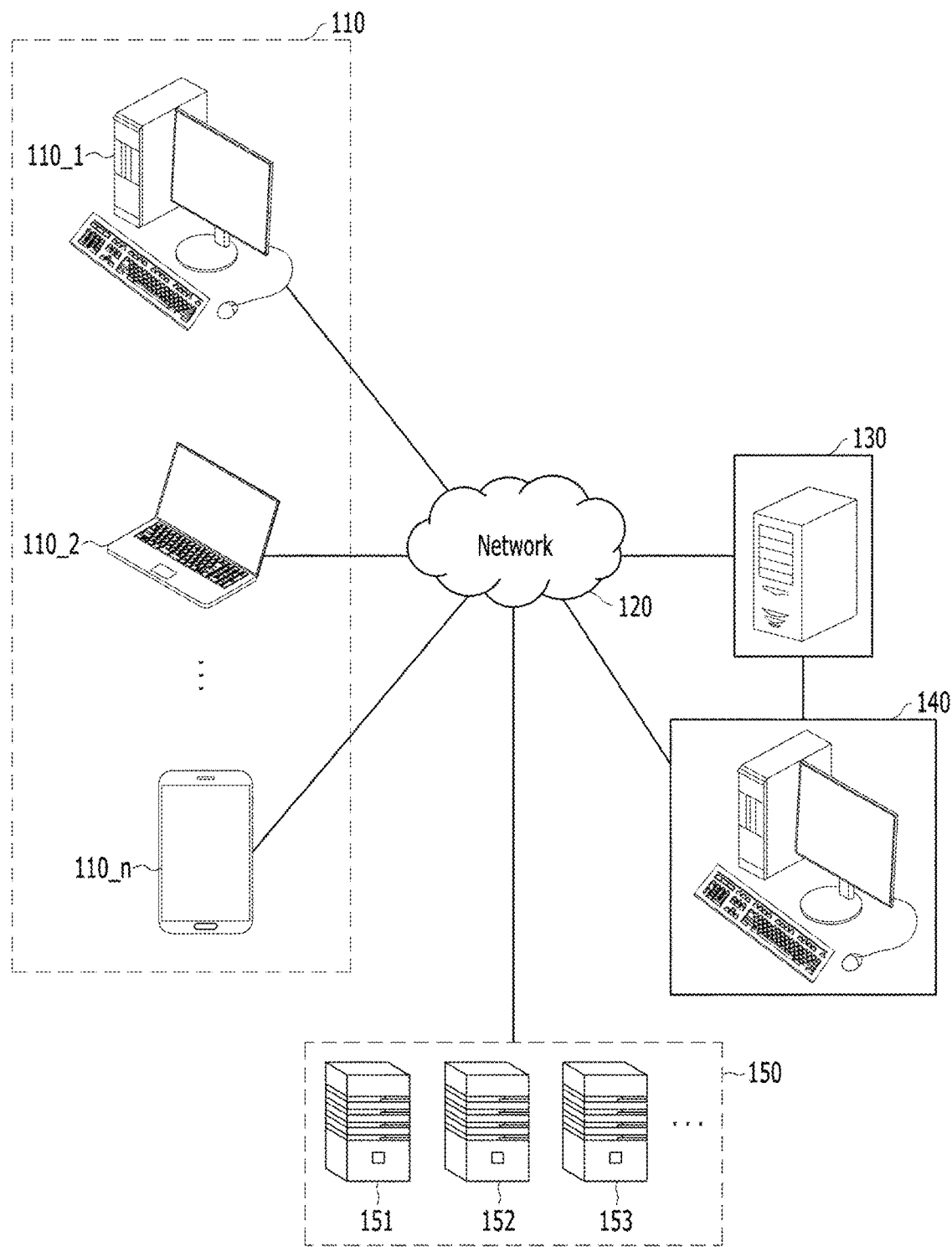
FIG. 1 is a block diagram illustrating a network environment including an automatic matching search advertising system based on a product according to an embodiment of the present disclosure.

Contents described in "Discussion of the Related Art" merely help understanding of the background technology for the technical spirit of the present disclosure, and thus cannot be understood as contents corresponding to a prior art known to those skilled in the art to which the present disclosure pertain.

In the following description, for a description purpose, many detailed contents are presented in order to help understanding of various embodiments. However, it is evident that the various embodiments may be implemented without such detailed contents or in one or more equivalent manners. In other examples, well-known structures and apparatuses are illustrated as block diagrams in order to avoid making it unnecessarily difficult to understand various embodiments.

Each block in the accompanying block diagrams may be executed by computer program instructions (execution engine). These computer program instructions may be installed in a processor of a general purpose computer, a special purpose computer or other programmable data processing equipment, and thus instructions executed through the processor of the computer or other programmable data processing equipment generate means for executing functions described in blocks of the block diagrams.

These computer program instructions may be stored in computer-available or computer-readable memory which may be directed toward a computer or other programmable data processing equipment in order to implement a function in a specific way. Accordingly, the instructions stored in the computer-available or computer-readable memory may also produce an article of manufacture including instruction means for executing the functions described in the blocks of the block diagrams.

Furthermore, the computer program instructions may also be installed in a computer or other programmable data processing equipment to cause a series of operational steps to be performed on the computer or other programmable data processing equipment, thus producing a computer-executable process. Accordingly, instructions executed on the computer or other programmable data processing equipment may also provide a function for executing the functions described in the blocks of the block diagram.

Furthermore, each block may represent a part of a module, segment or code including one or more executable instructions for executing specific logical functions. In some alternative embodiments, the functions described in the blocks or steps may occur in some other order.

That is, two blocks shown in a drawing may in fact be executed substantially concurrently, or the blocks may be executed in the reverse order of a corresponding function, if necessary.

A term used herein is intended to describe specific embodiments and is not intended to limit specific embodiments. In the entire specification, when it is described that any part "includes" any element, this means that unless described otherwise, the any part may further include another element without excluding another element. Unless defined otherwise, terms used herein have the same meanings as those commonly understood by a person having ordinary knowledge in the field to which the present disclosure pertain.

Hereinafter, embodiments of the present disclosure are more specifically described with reference to the accompanying drawings.

FIG. 1 is a block diagram illustrating a network environment including an automatic matching search advertising system based on a product according to an embodiment of the present disclosure.

Referring to FIG. 1, the network environment including the automatic matching search advertising system based on a product according to an embodiment of the present disclosure is configured to include a plurality of user terminals 100 (110_1, 110_2, . . . , 110_n), a network 120, an advertising server 130, a text analysis apparatus 140 (e.g. a computer) and affiliate servers 150 (151, 152, 153, . . . ).

The user terminal 110 includes a mobile terminal which may be carried by a user. For example, the user terminal 110 may be, for example, but not limited to, a smartphone, a tablet, a laptop computer, a personal computer, etc.

The advertising server 130 may provide a product search application to the user terminals 110, and the product search application (e.g. 112a in FIG. 2) provided by the advertising server 130 may be installed in the user terminals 110. The product search application 112a is an application or program suitable for accessing the advertising server 130, and may provide a specific function for enabling a user to perform various searches related to one or more products and to check the results of the search. That is, the product search application may access the advertising server 130, may receive a service page including various types of information such as an object, an image and text, and may display the received service page. The product search application 112a may also provide an image search function in addition to a keyword search function based on text. The image search function refers to a function capable of transmitting, to the advertising server 130, a product image photographed or stored by the user terminal 110 as a search image, and/or inputting a search keyword when the user terminals 110 accessing the advertising server 130 search for products.

More specifically, in accordance with a search keyword and/or a search image transmitted from the user terminal 110 through the product search application 112a, the automatic matching search advertising system based on a product (e.g., the advertising server 130 and the text analysis apparatus 140) according to an embodiment of the present disclosure may obtain accurate product advertising information corresponding to the search keyword and/or the search image matched with a product advertisement selected by the affiliate server 150. If the product search application is not installed in the user terminal 110, a user may download the application from the advertising server 130 and install the application in a terminal of the user.

The network 120 may be implemented as a wireless communication network or a wired communication network. In the exemplary embodiment, a communication method may include, for example, but not limited to, short-range wireless communication between devices, and/or a communication method may use a communication network (e.g., a mobile communication network, a wireless LAN, wired Internet or a broadcasting network) which may be included in the network 120.

The advertising server 130, that is, a network server capable of communicating with the user terminals 110 over the network 120, is a device that provides an online environment for a product-based automatic matching search advertising service according to an embodiment of the present disclosure through the product search application. The advertising server 130 may include at least one server apparatus that provides an instruction, a code, a file, content, a service, etc.

In the case of an embodiment of the present disclosure, when the affiliate server (e.g., the advertiser server) 150 accessing the advertising server 130 selects a specific advertising product among pieces of product advertising information through a product-based automatic matching advertising interface (for example, an interface illustrated in FIG. 7) provided by the advertising server 130 with respect to a user terminal that has inputted a given product search keyword and/or search image through the product search application, the advertising server 130 may perform an operation of preferentially providing a user with a selected advertisement based on a condition that text-based attribute values extracted from information of a product selected by an advertiser are matched with the search keyword inputted by the user terminal. Accordingly, the advertising server 130 may more efficiently perform optimal advertising suitable for the needs of final consumers.

Accordingly, the affiliate servers 150 are subjects that want to advertise their own products on the user terminals 110 through the advertising server 130. The first to third affiliate servers 151, 152, and 153 illustrated in FIG. 1 may be servers operated by different companies (i.e., advertisers). In the exemplary embodiment of FIG. 1, three affiliate servers 151, 152, and 153 are illustrated for illustration purposes only. A larger or smaller number of affiliate servers may be provided.

The text analysis apparatus 140 (for example, but not limited to, a computer, a server, or a processor included in a device) may perform a role or function of receiving, as metadata, text information corresponding to an image of each product selected or set by an advertiser, generating a product attribute value corresponding to the corresponding product by analyzing the text information, and providing the product attribute value. The text-based product attribute values stored in a database (DB) refer to values generated by analyzing text (s) corresponding to images for each product and extracting features of each product.

For example, the advertising server 130 according to an embodiment of the present disclosure provides the product-based automatic matching advertising interface (for example, an interface of FIG. 7) to the affiliate server (e.g., the advertiser server) 150 accessing the advertising server 130, so that the affiliate server 150 can select a specific advertising product among pieces of product advertising information. Accordingly, the text analysis apparatus 140 provides the advertising server 130 with the text-based attribute values extracted from information of the product selected by the advertiser. The advertising server 130 preferentially provides or outputs a user with a selected advertisement through a search result display screen of the product search application based on a condition that the search keyword inputted by the user is matched with text-based attribute values of the selected products.

FIG. 1 illustrates an embodiment in which the text analysis apparatus 140 is separated from the advertising server 130, but this is merely an exemplary embodiment. Alternatively, the text analysis apparatus 140 and the advertising server 130 may be implemented as one apparatus.

Furthermore, the advertising server 130 and/or the affiliate server 150 may be implemented in the form of a web server. In general, the web server can be connected to many and unspecified clients and/or other servers over an open computer network, such as the Internet, and refers to a computer system that receives a task execution request from a client or another web server and extracts and provides corresponding task results and computer software (or a web server program) installed therefor. However, in addition to the web server program, the web server may be understood as a wide concept including a series of application programs operating on the web server and various DBs constructed therein according to circumstances. For example, the advertising server 130 and/or the affiliate server 150 may be implemented using web server programs variously provided to hardware for a common server depending on operating systems, such as DOS, Windows, Linux, UNIX, and Macintosh. Websites and an Internet information server (IIS) used in a Windows environment, and CERN, NCSA, APPACH, etc. used in a UNIX environment may be used as a representative web server program.

Figure 2:
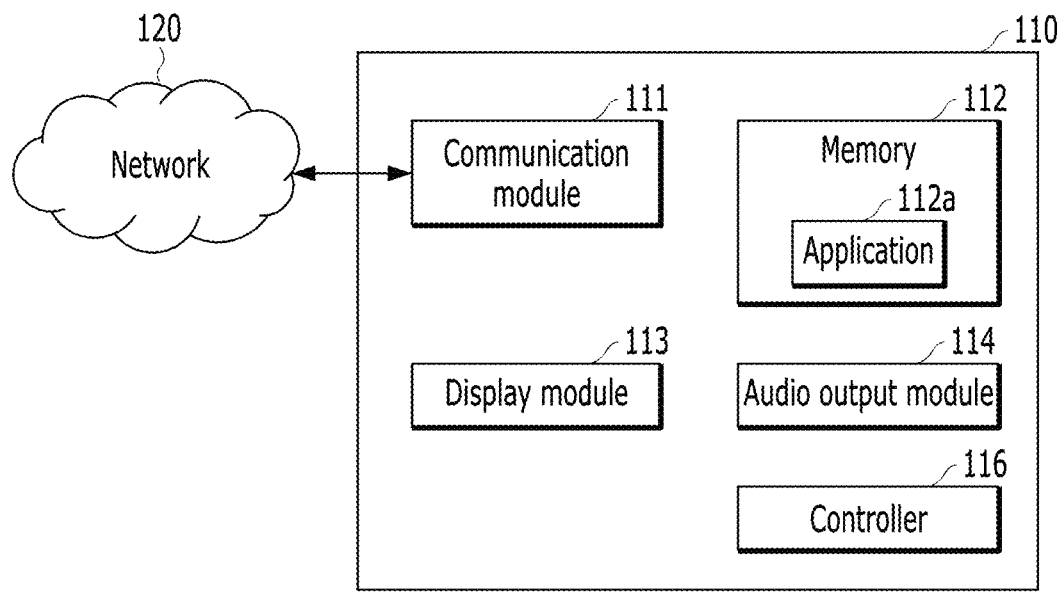
FIG. 2 is a block diagram illustrating a construction of a user terminal illustrated in FIG. 1 according to an embodiment of the present disclosure.

FIG. 2 is a block diagram illustrating a construction of the user terminal illustrated in FIG. 1.

Referring to FIG. 2, each of the user terminals 110 may include a communication module 111, a memory 112, a display module 113, an audio output module 114 and a controller 116.

The communication module 111 may be connected to a given internal element and/or at least one given external device for communication over the network 120. In this case, the given external device may include the advertising server 130 and/or the text analysis apparatus 140 illustrated as an example in FIG. 1. In this case, a wireless Internet technology includes a wireless LAN (WLAN), digital living network alliance (DLNA), wireless broadband (Wibro), world interoperability for microwave access (Wimax), high speed downlink packet access (HSDPA), high speed uplink packet access (HSUPA), IEEE 802.16, long term evolution (LTE), long term evolution-advanced (LTE-A), wireless mobile broadband service (WMBS), etc. The communication module 111 transmits and receives data according to at least one wireless Internet technology within a range including even an Internet technology not described above.

Furthermore, a short-range communication technology may include Bluetooth, radio frequency identification (RFID), infrared data association (IrDA), ultra wideband (UWB), ZigBee, near field communication (NFC), ultra sound communication (USC), visible light communication (VLC), Wi-Fi, Wi-Fi Direct, etc.

The memory 112 stores various user interfaces (UIs), graphic UIs (GUIs), etc. Furthermore, the memory 112 stores data, a program, etc. necessary for an operation of the user terminal 110. That is, the memory 112 may store multiple application programs (hereinafter referred to as "applications") driven in the user terminal 110, data for an operation of the user terminal 110, and instructions. That is, at least one application is stored in the memory 112 of the user terminal 110 according to an embodiment of the present disclosure. At least some of such applications may be downloaded from an external server through wireless communication. In an embodiment of the present disclosure, at least some of such applications include the product search application 112a provided by the advertising server 130 illustrated in FIG. 1.

Furthermore, the applications may be implemented as an automatic speech recognition (ASR) application, a map application, a media application (e.g., QuickTime, MobileMusic.app or MobileVideo.app), social networking applications (e.g., Facebook or Twitter), an Internet browsing application, etc. The applications may be stored in the memory 112, may be installed in the user terminal 110, and may be driven to perform an operation (or function) of the user terminal 110 by the controller 116.

Furthermore, the memory 112 may include at least one storage medium among a flash memory type, a hard disk type, a multimedia card micro type, a card type memory (e.g., an SD or XD memory), a magnetic memory, a magnetic disk, an optical disk, a random access memory (RAM), a static random access memory (SRASM), a read-only memory (ROM), an electrically erasable and programmable ROM (EEPROM), and a programmable ROM (PROM).

The display module 113 may display various content, such as various menu screens, by using a user interface (UI) and/or a graphic UI stored in the memory 112 under the control of the controller 116, and may display an interface or execution result screen of the product search application 112a executed under the control of the controller 116.

For example, when the product search application 112a is executed, the display module 113 may display, on a screen, a UI provided by the product search application 112a.

In this case, content displayed by the display module 113 may include various text or image data (including a variety of information data) and menu screens indicative of an icon, a list menu, etc. The display module 113 may be implemented as a liquid crystal display (LCD), an organic light-emitting diode (OLED), a flexible display, a 3D display, an e-ink display, a light-emitting diode (LED), etc.

The audio output module 114 may output voice or sound information included in a signal on which given signal processing has been performed under the control of the controller 116. In this case, the audio output module 114 may include a receiver, a speaker, etc.

Figure 3:
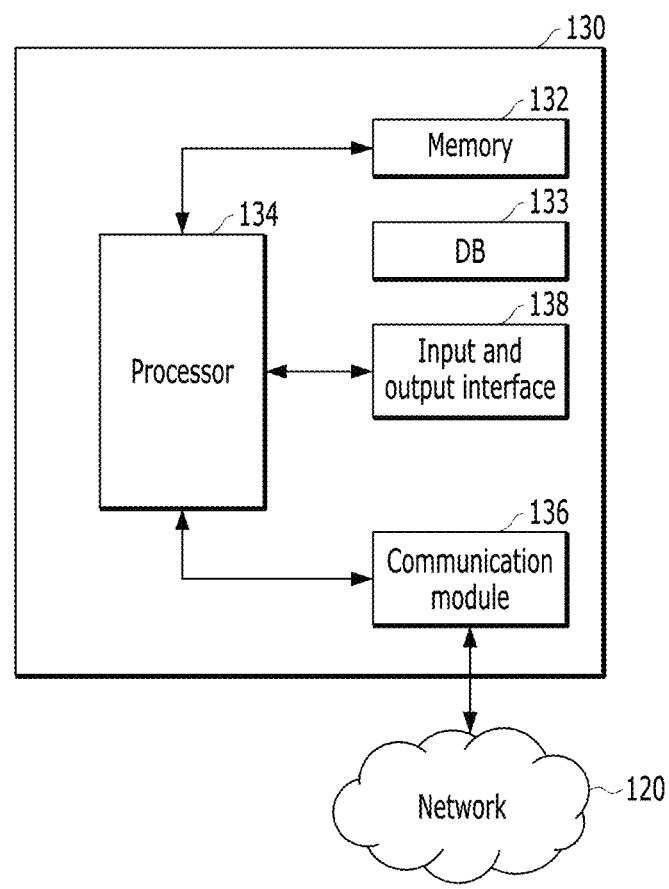
FIG. 3 is a block diagram schematically illustrating an internal construction of an advertising server illustrated in FIG. 1 according to an embodiment of the present disclosure.

FIG. 3 is a block diagram schematically illustrating an embodiment of an internal construction of the advertising server illustrated in FIG. 1.

Referring to FIG. 3, the advertising server 130 may include a memory 132, a DB 133, a processor 134, a communication module 136 and an input and output interface 138.

The memory 132 is a computer-readable recording medium, and may include high-capacity permanent recording devices, such as a RAM, a ROM and a disk drive. Furthermore, the memory 132 may store an operating system and at least one program code. Such software elements may be loaded from a computer-readable recording medium different from the memory 132 by using a drive mechanism. Such a separate computer-readable recording medium may include recording media, such as a floppy drive, a disk, a tape, a DVD/CD-ROM drive, and a memory card. Furthermore, the software elements may be loaded onto the memory 132 through the communication module 136.

Figure 4:
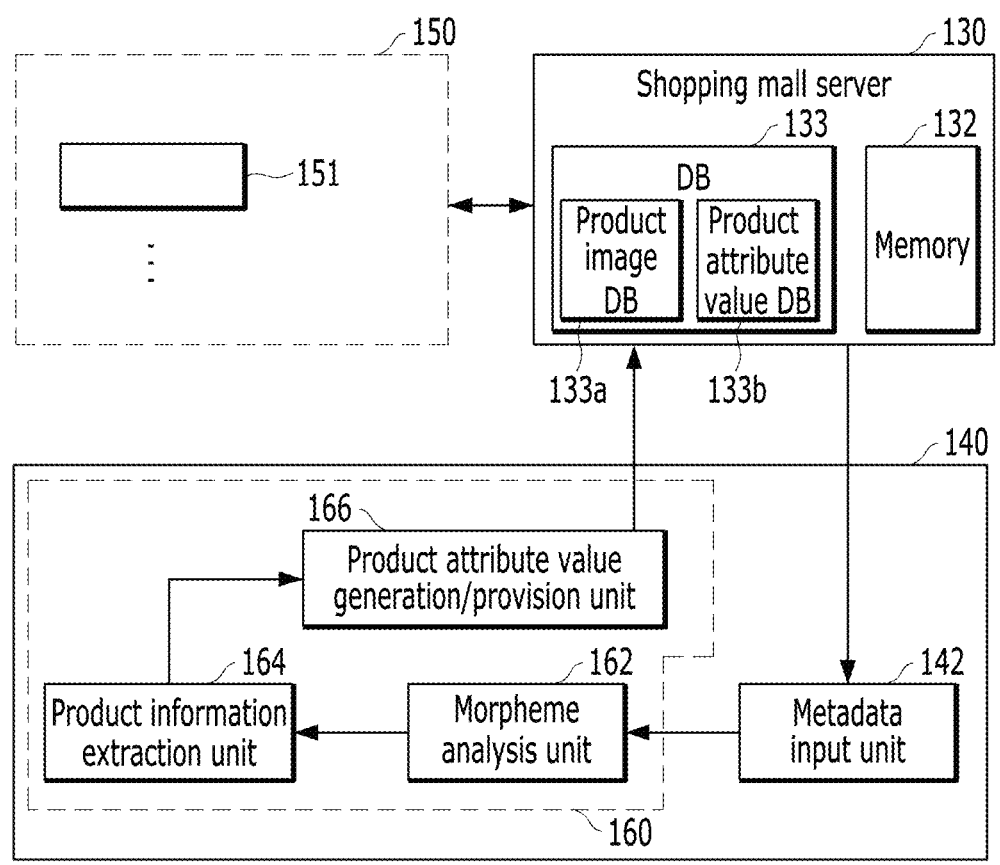
FIG. 4 is a block diagram illustrating a construction of a text analysis apparatus according to an embodiment of the present disclosure.

The DB 133 may store and retain pieces of information transmitted to and received from the user terminals 110 and/or the affiliate server 150 accessing the advertising server 130 according to an embodiment of the present disclosure. Furthermore, the DB 133 may store image information of products owned by the advertising server 130 and text-based attribute values corresponding to an image for each product. For example, as illustrated in FIG. 4, the DB 133 may include a first DB 133a in which product images of products are stored and a second DB 133b in which attribute values of products corresponding to images for each product are stored. For example, the text-based attribute values may be information generated by analyzing pieces of text corresponding to images for each product and extracting features of the products.

The processor 134 may be configured to process an instruction of a computer program by performing basic arithmetic, logic and input and output operations. The instruction may be provided to the processor 134 by the memory 132 or the communication module 136. For example, the processor 134 may be configured to execute an instruction received along with a program code stored in a recording device, such as the memory 132. That is, the processor 134 may include a program module that is implemented by C, C++, Java, Visual Basic, Visual C, etc. in software manner and that performs various functions.

The advertising server 130 performs a role, function or operation of providing an online environment in which the multiple user terminals 110 may search for various products (e.g., clothing products) through the product search application provided by the advertising server 130 over the network 120 and users may buy desired products.

Furthermore, the advertising server 130 may provide the product-based automatic matching advertising interface (for example, an interface illustrated in FIG. 7) which enables the affiliate server (i.e., the advertiser server) 150 accessing the advertising server 130 to select one of specific advertising products stored in the DB 133.

For example, when the affiliate server (i.e., the advertiser server) 150 accessing the advertising server 130 selects a specific advertising product among pieces of product advertising information through the product-based automatic matching advertising interface provided by the advertising server 130 with respect to a user terminal that has inputted a given product search keyword through the product search application, the advertising server 130 may perform an operation of preferentially providing a selected advertisement to a user based on a condition that text-based attribute values extracted from information of a product selected by an advertiser are matched with a search keyword inputted by the user.

Basic operations of the advertising server 130 and the text analysis apparatus 140 according to an embodiment of the present disclosure are more specifically described with reference to FIGS. 4 to 6.

The communication module 136 may provide a function for enabling the user terminals 110 and the advertising server 130 to communicate with each other over the network 120. For example, a control signal, an instruction, content, a file, etc. provided under the control of the processor 134 of the advertising server 130 may be transmitted to the user terminals 110 through the communication module 136 over the network 120.

The input and output interface 138 may perform a role, function or operation of providing an interface between an input device implemented as a keyboard or a mouse, etc. and an output device, such as a display, or a touch screen.

FIG. 4 is a block diagram illustrating a construction of a text analysis apparatus according to an embodiment of the present disclosure. FIG. 5 is an exemplary diagram illustrating information of a specific product included in a product DB according to an embodiment of the present disclosure.

Figure 5:
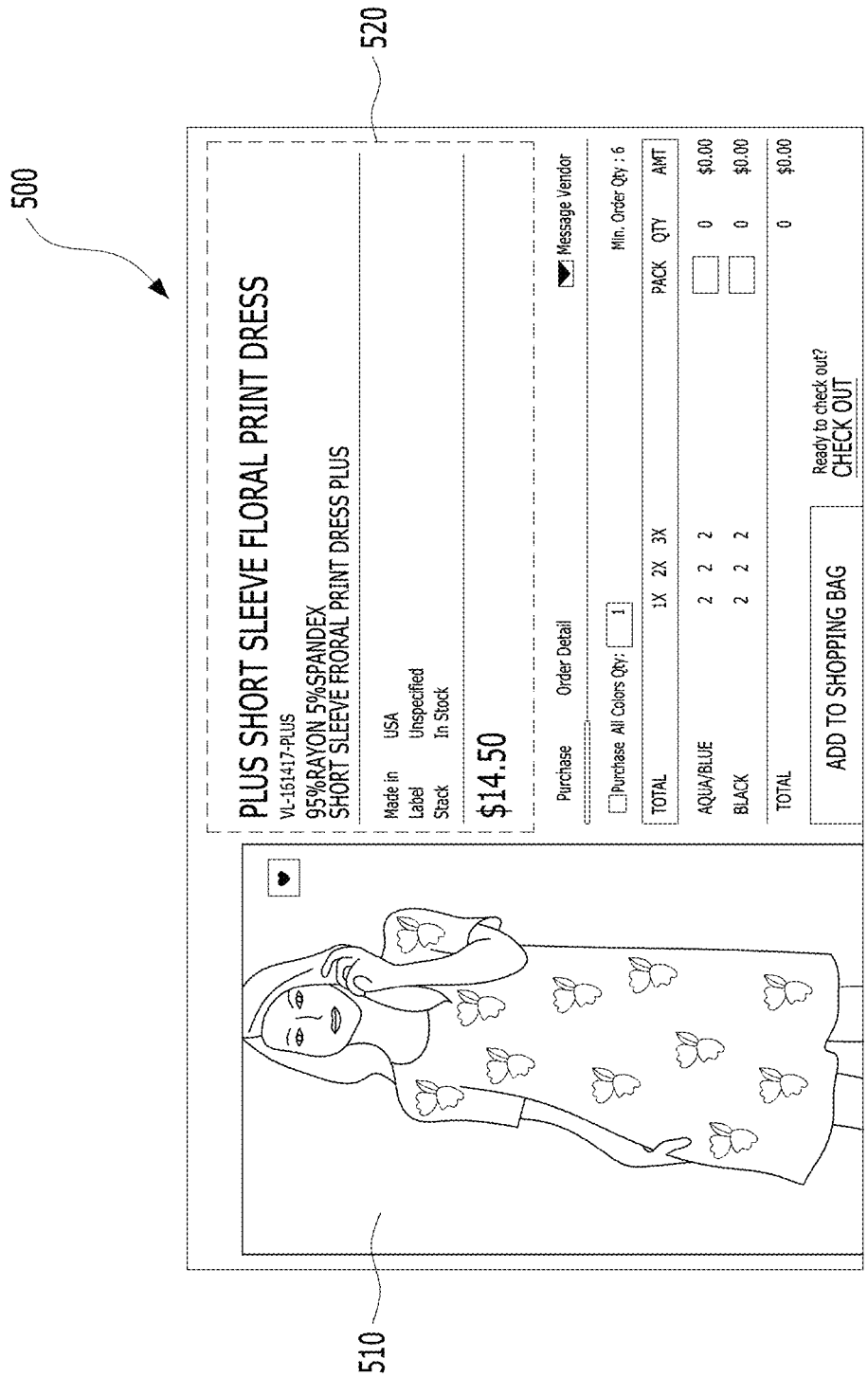
FIG. 5 is an exemplary diagram illustrating information of a specific product included in a product database according to an embodiment of the present disclosure.

First, referring to FIGS. 4 and 5, the text analysis apparatus 140 according to an embodiment of the present disclosure performs an operation of receiving, as metadata, text information corresponding to an image of each product, generating a product attribute value corresponding to the corresponding product by analyzing the text information, and providing the product attribute value. The text analysis apparatus 140 may include a metadata input unit 142 and a machine learning algorithm execution unit 160. The machine learning algorithm execution unit 160 may include a morpheme analysis unit 162, a product information extraction unit 164 and a product attribute value generation/provision unit 166. Furthermore, the text analysis apparatus 140 may operate in conjunction with the DB 133 of the advertising server 130.

The DB 133 is a product DB, and may store image information of products owned by the advertising server 130 and attribute values of products corresponding to images for each product. For example, as illustrated in FIG. 4, the DB 133 may include a first DB 133*a* in which product images of products are stored and a second DB 133*b* in which attribute values of products corresponding to images for each product, that is, text-based attribute values, are stored.

Furthermore, the text analysis apparatus 140 illustrated in FIG. 4 may be implemented as a processor. In this case, the metadata input unit 142 and the machine learning algorithm execution unit 160, that is, elements of the text analysis apparatus 140, and the morpheme analysis unit 162, the product information extraction unit 164 and the product attribute value generation/provision unit 166, that is, elements of the machine learning algorithm execution unit 160, may be understood to divisively represent different functions or operations performed by a processor. In this case, as described above, the processor may be implemented as a separate processor different from the processor 134 included in the advertising server 130, but an embodiment of the present disclosure is not limited thereto. That is, each of the elements of the text analysis apparatus 140 may be a function block implemented or executed in the processor 134 of the advertising server 130.

The metadata input unit 142 may receive, as metadata, text information corresponding to an image of a product provided by the advertising server 130.

FIG. 5 is a part of a screen displayed on an interface provided by the advertising server 130, and is an exemplary diagram illustrating information 500 of a specific advertising product among pieces of product advertising information stored in the product DB 133. More specifically, FIG. 5 illustrates a part of a product display screen displayed through the product-based automatic matching advertising interface (e.g. an interface shown in FIG. 7) provided from the advertising server 130 to the affiliate server 150.

The information 500 of the product may include a representative image 510 of the product and text information 520 corresponding to the product image 510.

Referring to FIG. 5, the product image 510 may include clothing having a specific design, for example. Detailed description or information of such a product image 510 may be written in the text information 520 disposed and displayed on the side of the product image 510.

In the case of the embodiment of FIG. 5, "PLUS SHORT SLEEVE FLORAL PRINT DRESS", "95% RAYON, 5% SPANDEX", "made in USA", "$14.50", etc. written as the text information 520 may be used as metadata indicating various features of the product. For example, the text information may be used as metadata including information, such as the classification (dress/short sleeve) of a product, a design (floral print), a size (plus), a material (95% rayon, 5% spandex), a manufacturing country (made in USA), and a price range or price ($14.50).

Accordingly, the metadata input unit 142 may receive, as metadata, the text information 520 corresponding to the product image 510. The text information 520 as the inputted metadata is transmitted or delivered to the machine learning algorithm execution unit 160. The machine learning algorithm execution unit 160 may perform an operation of generating a product attribute value corresponding to each product by analyzing the metadata, and providing the product attribute value. The machine learning algorithm execution unit 160 may include the morpheme analysis unit 162, the product information extraction unit 164 and the product attribute value generation/provision unit 166.

The morpheme analysis unit 162 performs an operation of analyzing, in a morpheme unit, pieces of text inputted in the form of a sentence or a combination of various words like the text information 520.

For example, if the inputted text is Korean, in general, morpheme analysis may be performed using a method, such as "morpheme candidate analysis" using tabular parsing or "part of speech tagging" based on machine learning. Furthermore, a machine learning method, such as a hidden Markov model (HMM) or a conditional random field (CRF), may be used in the morpheme analysis. In addition, a method to which deep learning has been applied may be used in the morpheme analysis.

According to an embodiment of the present disclosure, metadata inputted to the morpheme analysis unit 162, that is, pieces of text information corresponding to an image of each product, may be divided into given morphemes and transmitted or delivered to the product information extraction unit 164.

The product information extraction unit 164 may perform an operation of extracting, from the morphemes, pieces of feature information of a product corresponding to the product image 510 by analyzing the received morphemes.

For example, the process of extracting pieces of feature information of a product may be implemented by previously constructing ontology for the product (e.g., a clothing product) and analyzing text information divided into morphemes by using the ontology. That is, features of a product category (or subcategory) may be extracted by analyzing the pieces of text information.

As an example of the ontology, if the product is limited to women's clothing, categories of the product may include dresses, tops, etc. The category of the dress may include subcategories, such as a pattern, a style, and a length. For example, the pattern may include "floral print, stripe print, . . . ", the style may include "trapeze, ruffle, . . . ", and the length may include "maxi, half, . . . ."

Furthermore, the category of the tops may include subcategories, such as a pattern, a style, and a length. For example, the pattern may include "stripe, graphic, . . . ", the style may include "tunic, tank top, . . . ", and the length may include "hip, cropped, . . . ."

According to an embodiment of the present disclosure, pieces of feature information of a product extracted by the product information extraction unit 164 may be transmitted or delivered to the product attribute value generation/provision unit 166.

The product attribute value generation/provision unit 166 may perform an operation of generating product attribute values corresponding to each product by comparing the received pieces of feature information of the corresponding product with previously set and stored product attribute values and converting the feature information into product attribute values matched with the feature information.

For example, the process of generating product attribute values corresponding to a product by converting feature information into the product attribute values may include constructing a synonymous word DB for a vendor name, a product name, etc. used in the advertising server 130, constructing an abbreviation, synonym and conjugation (the singular form and the plural form, etc.) DB for categories (or subcategories) of products, and converting feature information into product attribute values matched therewith by using the synonymous word DB and the abbreviation, synonym and conjugation DB.

Furthermore, product attribute value information for each product generated through the process may be provided from the product attribute value generation/provision unit 166 to the advertising server 130, and may be stored in the DB 133 of the advertising server 130, more specifically, the second DB 133b in which attribute values of products corresponding to images for each product are stored.

FIG. 6 is a diagram describing an example in which product attribute values are extracted from text information of a selected advertising product.

FIG. 6 illustrates first to fourth pieces of text information 522, 524, 526, and 528 which may be used as metadata. That is, the first to fourth pieces of text information 522, 524, 526, and 528 may be used as metadata, that is, unique information of a product.

For example, "Dress Forum", that is, the first text information 522, is the name of a seller. "Cheetah Ruffled Mini Skirt", that is, the second text information 524, is a product name. "FS4861", that is, the third text information 526, is a product code. "Cheetah print mini skirt featuring a flowy ruffled hem and short lining. Model is 5'8" and wearing size Small", that is, the fourth text information 528, is a description of the product.

As described with reference to FIGS. 4 and 5, the text analysis apparatus 140 may receive the first to fourth pieces of text information 522, 524, 526, and 528 as metadata, and may extract words from the text information by using the blank or space of each of pieces of text information as a delimiter. For example, all the words may be converted into lower cases, and only one redundant word may be selected. In this case, when an infinitive of the extracted word is present, the infinitive may be added. For example, "ruffle" that is an infinitive of "ruffled", "feature" that is an infinitive of "featuring", "line" that is an infinitive of "lining", etc. may be added to product attribute values.

Accordingly, in the example illustrated in FIG. 6, "dress, forum, cheetah, ruffled, mini, skirt, fs4861, print, featuring, a, flowy, hem, and, short, lining, model, is wearing, size, small, ruffle, feature, line, be, wear" may be extracted product attribute values.

Figure 7:
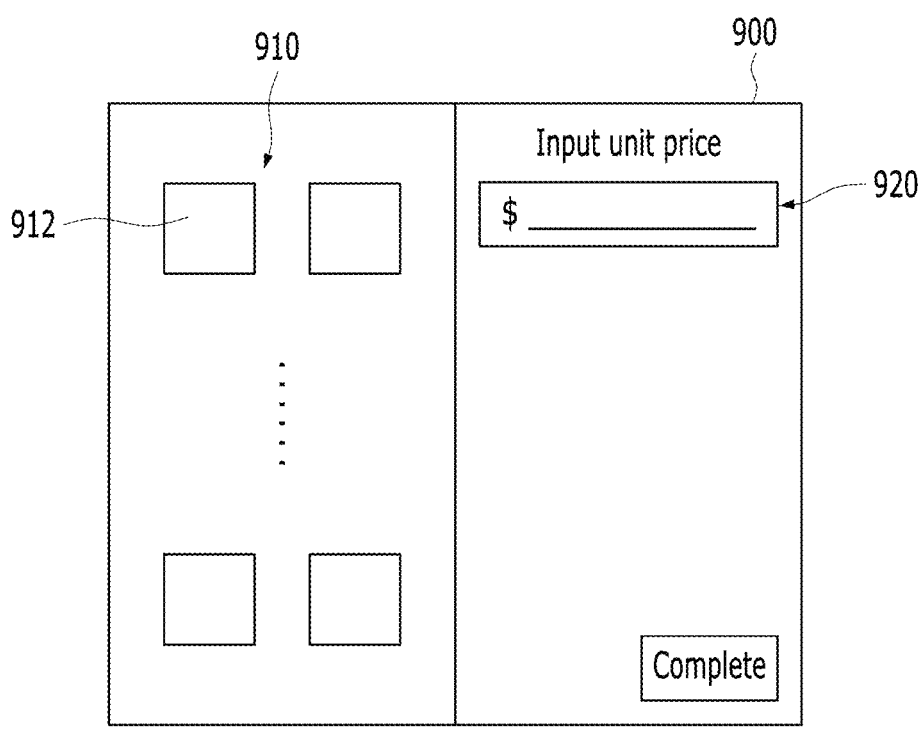
FIG. 7 is an exemplary diagram of a product-based automatic matching advertising interface according to an embodiment of the present disclosure.

FIG. 7 is an exemplary diagram of a product-based automatic matching advertising interface provided by an embodiment of the present disclosure.

The affiliate server (i.e., the advertiser server) 150 accessing the advertising server 130 may select a specific advertising product among pieces of product advertising information through a product-based automatic matching advertising interface 900 provided by the advertising server 130.

Referring to FIG. 7, the product-based automatic matching advertising interface 900 may include a product advertising DB display unit or area 910 which displays pieces of product advertising information 912 stored in the DB 133 of the advertising server 130 and a unit price input unit or interface 920 through which an advertising bidding price of a selected advertising product may be inputted.

More specifically, the affiliate server 150 that accesses the advertising server 130 and receives a screen of the product-based automatic matching advertising interface 900 may select specific product advertising information 912 to be adverted among product advertisements included in the product advertising DB display unit 910. In this case, the selected specific product advertising information 912 is substantially the same as the information 500 of the product illustrated in FIG. 5.

Furthermore, the affiliate server 150 may write an advertising bidding price of the selected product advertising information 912 through the unit price input unit 920.

After the specific product advertising information 912 is selected and an advertising bidding price of the selected advertising information is written as described above, when a "Complete" icon is clicked on, a product advertising request operation by the affiliate server 150 is completed.

In the embodiment illustrated in FIG. 7, an example in which one piece of specific product advertising information is selected and a unit price of the selected product advertising information is inputted has been described, but an embodiment of the present disclosure is not limited thereto.

For example, the affiliate server 150 may select a plurality of pieces of product advertising information in addition to one piece of specific product advertising information. That is, the affiliate server 150 may select one or more of the pieces of product advertising information 912 displayed by the product advertising DB display unit 910 of the product-based automatic matching advertising interface 900, and may individually input advertising bidding prices of the pieces of selected specific product advertising information, respectively, through the unit price input unit 920. As described above, when a plurality of pieces of product advertising information is selected, the plurality of the unit price input units 920 corresponding to the number of pieces of selected product advertising information may be generated and displayed.

Thereafter, as described in detail with reference to FIGS. 4 to 6, the advertising server 130 and the text analysis apparatus 140 can perform an operation of extracting text-based product attribute values from the selected product advertising information 912.

Figure 9:
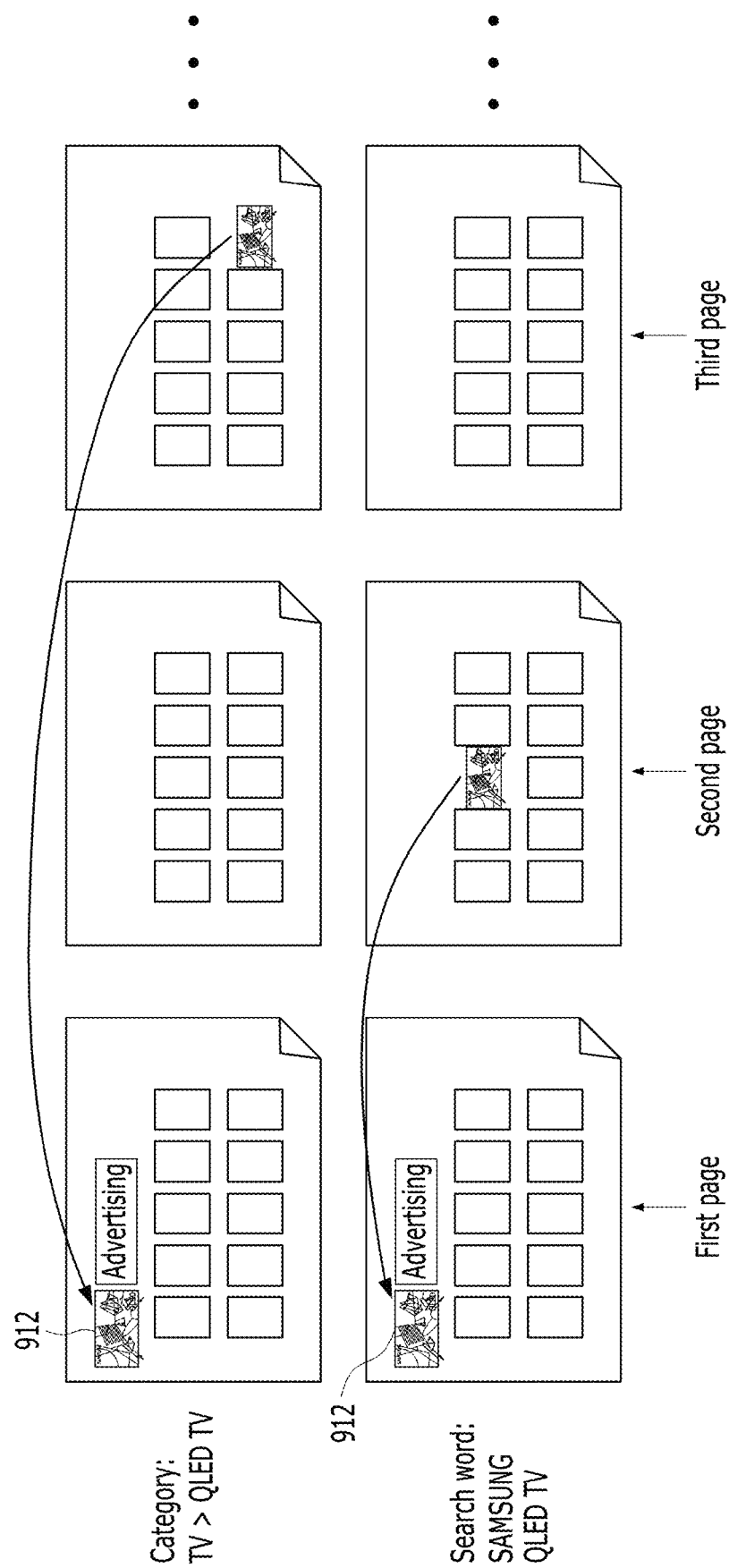

FIGS. 8 and 9 are diagrams describing an operation of advertising a product using a product-based automatic matching advertising interface according to an embodiment of the present disclosure.

First, FIG. 8 illustrates the product advertising information 912 selected by the affiliate server 150 and the advertising bidding price information inputted to the unit price input unit 920 in accordance with the selected product advertising information 912. The information is transmitted to the advertising server 130 when the affiliate server 150 clicks on the "Complete" icon in the product-based automatic matching advertising interface 900. The selected product advertising information 912 illustrated in FIG. 8 describes the advertising information of "Samsung QLED TV product" as an example.

Accordingly, the advertising server 130 determines whether to advertise the product advertising information 912 selected by the affiliate server 150 based on the information.

For example, the advertising server 130 may determine whether to advertise the selected product advertising information 912 based on the advertising bidding price inputted by the affiliate server 150. As illustrated in FIG. 1, the affiliate server 150 may be implemented in plural. Accordingly, each of the first to third affiliate servers 151, 152, and 153 may select product advertisements belonging to the same category. In this case, when determining which one is to be advertised among the pieces of selected advertising information of the first to third affiliate servers 151 to 153, the advertising server 130 may consider an advertising bidding price inputted by each affiliate server. For example, the advertising server 130 may select an affiliate server that has inputted the highest advertising bidding price or may select an advertising product having the highest profits expected by the advertising server 130.

More specifically, with respect to first product advertising information selected by the first affiliate server 151 and a first advertising bidding price thereof and second product advertising information selected by the second affiliate server 152 and a second advertising bidding price thereof, the following descriptions are made on the assumption that the first product advertising information and the second product advertising information correspond to products belonging to substantially the same category.

First, when the first advertising bidding price inputted by the first affiliate server 151 is higher than the second advertising bidding price inputted by the second affiliate server 152, the advertising server 130 may determine to preferentially advertise the first product advertising information of the first affiliate server 151. In this case, preferentially advertising may be implemented by exposing the first product advertising information onto the first page of a search result screen with respect to search results of user terminals.

Next, when the first advertising bidding price inputted by the first affiliate server 151 is the same as the second advertising bidding price inputted by the second affiliate server 152, an additional criterion is needed for determining which product information is to be preferentially advertised. Such a criterion may be set and applied by the advertising server 130. For example, as described above, the advertising server 130 may select an advertising product in which the advertising server 130 can expect the highest profits, and may preferentially advertise the advertising product. In this case, a method of calculating expected profits for each product may be autonomously implemented by the advertising server 130, and may be stored in the DB 132 of the advertising server 130. Furthermore, the stored method of calculating expected profits may be changed or updated.

FIG. 9 is a diagram describing an example of an operation in which the advertising server 130 determines to advertise the selected product advertising information 912 illustrated in FIG. 8.

When the advertising server 130 determines to advertise specific advertising product information selected by the affiliate server 150 as described above, the text analysis apparatus 140 provides the advertising server 130 with text-based attribute values extracted from the information of the product selected by the advertiser. The advertising server 130 preferentially provides the selected advertisement to a user through a search result display screen of the product search application based on a condition that a search keyword and/or a search image inputted by the user is matched with text-based attribute values of the selected product.

More specifically, FIG. 9 illustrates an example of a search result display screen of the product search application 112*a* of the user terminal 110. Results corresponding to a search keyword inputted by a user may include pieces of advertising information exposed onto a plurality of pages.

For example, a user may select QLED TV in a TV category by using a category search function of the product search application 112*a* or may directly input "SAMSUNG QLED TV" by using a search word input function of the product search application 112*a*.

In this case, in a conventional common advertising method, the product advertising information 912 selected by the affiliate server 150 may not be preferentially exposed onto a search result display screen of the product search application. That is, although the product advertising information 912 cannot be exposed onto the first page of the search result display screen, according to an embodiment of the present disclosure, when a search keyword and/or search category inputted by the user is matched with text-based attribute values of the selected advertising information 912, the product advertising information 912 can be preferentially displayed onto the first page of the search result display screen as illustrated in FIG. 9. That is, according to an embodiment of the present disclosure, it is possible to more efficiently perform optimal advertising suitable for the needs of a final consumer by preferentially providing the selected advertising information to the consumer.

Furthermore, a conventional method may require a process of expecting, by an advertiser, a search word or category frequently used by a consumer in order to advertise a product of the advertiser online and previously setting a keyword describing the product or a corresponding category. The advertiser sets a keyword or category having a wider range in order to more expose the product of the advertiser. However, although a specific search keyword is used a lot by a user, if actual association between selling products and the search keyword is low, the user will be highly likely not to click on the advertising of the selling product. Accordingly, an advertising system using such a method may not be efficient on the part of an advertiser.

In contrast, according to an embodiment of the present disclosure, when the affiliate server 150, that is, an advertiser, selects a specific product among pieces of product advertising information provided by the advertising server 130, product attribute values may be automatically generated, and a selected advertisement may be preferentially provided to a user based on a condition that the product attribute values are matched with a search keyword inputted by the user who has accessed an online shopping mall, etc. Accordingly, optimal advertising suitable for the needs of final consumers can be more efficiently performed.

Furthermore, optimal advertising efficiency can be achieved in a way that an advertiser selects a specific product among pieces of product advertising information provided by the advertising server and provides advertising bidding price information for the selected product.

Figure 10:
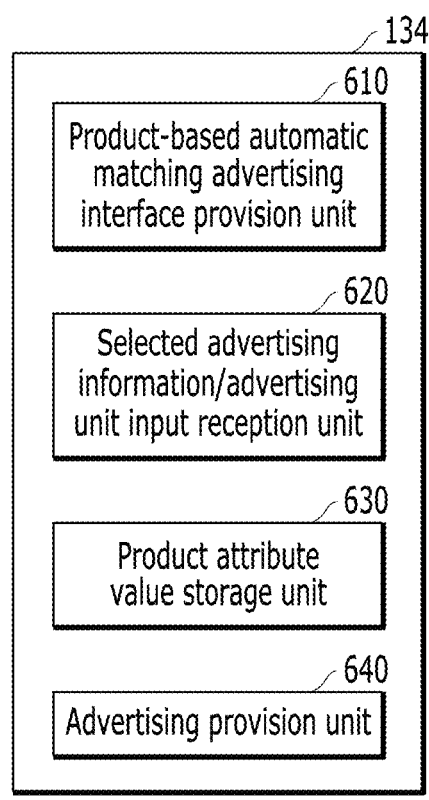
FIG. 10 is a block diagram illustrating an embodiment of an internal construction of a processor illustrated in FIG. 3 according to an embodiment of the present disclosure.
Figure 11:
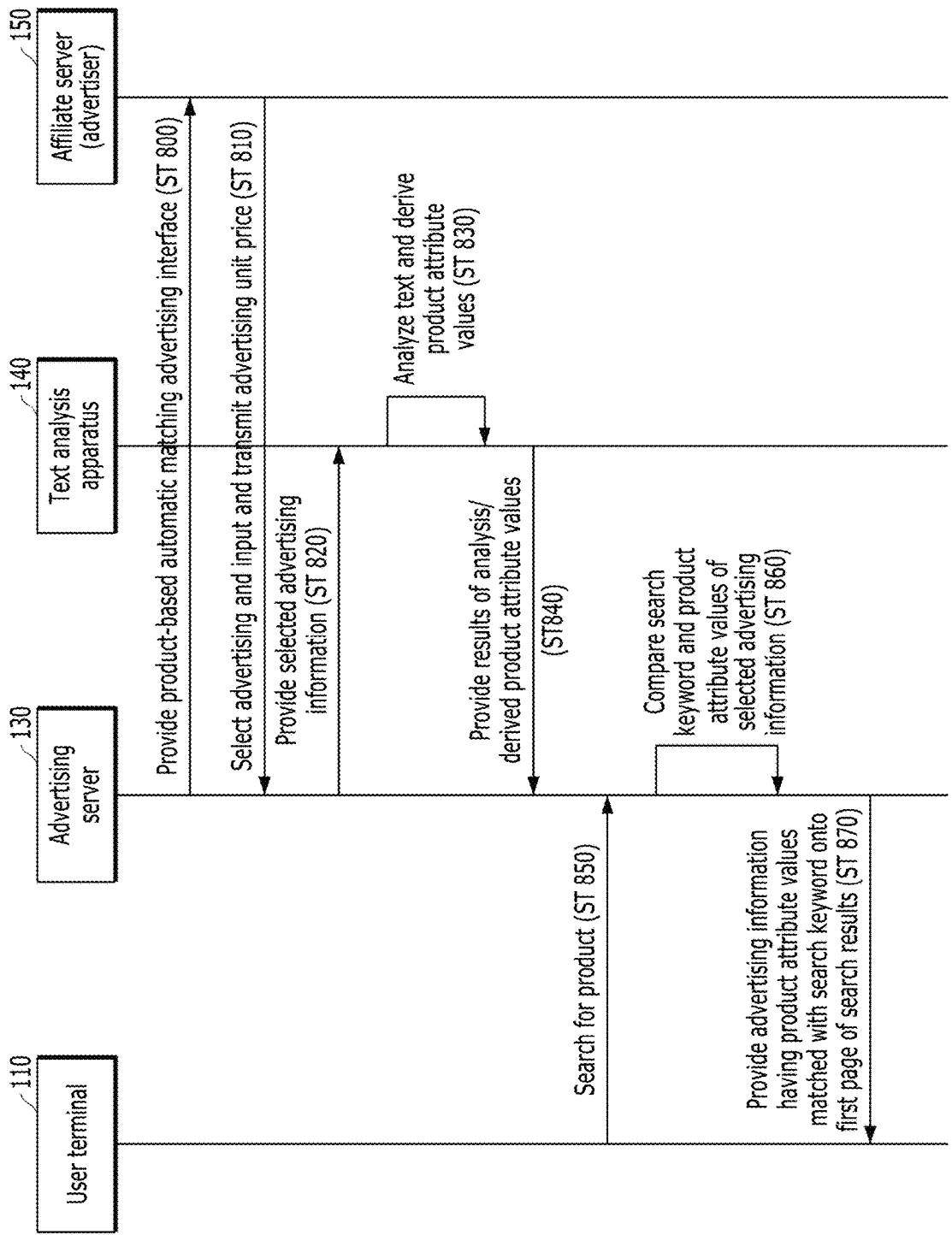
FIG. 11 is a flowchart illustrating an automatic matching search advertising method based on a product according to an embodiment of the present disclosure

FIG. 10 is a block diagram illustrating an embodiment of an internal construction of the processor illustrated in FIG. 3. FIG. 11 is a flowchart illustrating an automatic matching search advertising method based on a product according to an embodiment of the present disclosure.

Referring to FIGS. 10 and 11, the processor 134 of the advertising server 130 may include a product-based automatic matching advertising interface provision unit 610, a selected advertising information/advertising unit price input reception unit 620, a product attribute value storage unit 630 and an advertising provision unit 640. Furthermore, the processor 134 may control the advertising server 130 to perform steps ST 800, ST 810, ST 820, ST 830, ST 840, ST 850, ST 860 and ST 870 included in the automatic matching search advertising method based on a product illustrated in FIG. 11.

In this case, the processor 134 may be implemented or configured to execute an instruction according to codes of an operating system included in the memory 132 and at least one program code. In this case, elements of the processor 134, that is, the product-based automatic matching advertising interface provision unit 610, the selected advertising information/advertising unit price input reception unit 620, the product attribute value storage unit 630 and the advertising provision unit 640, may be understood to divisively represent different functions performed by the processor 134 in response to a control command provided by a program code stored in the advertising server 130.

The product-based automatic matching advertising interface provision unit 610 performs an operation of providing the affiliate server 150 with the product-based automatic matching advertising interface according to an embodiment of the present disclosure (ST 800). For example, FIG. 7 is an exemplary diagram of a product-based automatic matching advertising interface provided by an embodiment of the present disclosure.

Referring to FIG. 7, the product-based automatic matching advertising interface 900 may include the product advertising DB display unit or area 910 which displays the pieces of product advertising information 912 stored in the DB 133 of the advertising server 130 and the unit price input unit or interface 920 through which an advertising bidding price of a selected advertising product can be written.

Accordingly, the affiliate server 150 that accesses the advertising server 130 and receives a screen of the product-based automatic matching advertising interface 900 may select specific product advertising information 912 to be advertised among product advertisements included in the product advertising DB display unit 910, and may write an advertising bidding price of the selected product advertising information 912 through the unit price input unit 920.

However, as described above, the affiliate server 150 may select one or more of the pieces of product advertising information displayed by the product advertising DB display unit 910. When a plurality of pieces of product advertising information are selected, a plurality of unit price input units 920 corresponding to the number of pieces of selected product advertising information may be generated, and an advertising bidding price for each selected product advertising may be written therein.

After at least one piece of specific product advertising information 912 is selected and an advertising bidding price of the selected advertising information is written as described above, when the "Complete" icon is clicked on, a product advertising request operation by the affiliate server 150 is completed. The selected product advertising information and advertising unit price input information are transmitted from the affiliate server 150 to the advertising server 130 (ST 810). Accordingly, according to an embodiment of the present disclosure, optimal advertising efficiency can be achieved in a way that an advertiser selects a specific product among pieces of product advertising information provided by the advertising server 130 and provides advertising bidding price information for the selected product.

The selected advertising information/advertising unit price input reception unit 620 performs an operation of receiving the selected product advertising information and the advertising unit price input information, that is, information inputted through the product-based automatic matching advertising interface 900, and then provides the selected advertising information to the text analysis apparatus 140 illustrated in FIG. 4 (ST 820).

At this time, the advertising server 130 may determine whether to advertise the selected product advertising information 912 based on the advertising bidding price inputted by the affiliate server 150, and may provide the selected advertising information to the text analysis apparatus 140 illustrated in FIG. 4 when the advertising server 130 determines to advertise the selected product advertising information 912.

For example, the advertising server 130 may determine whether to advertise the selected product advertising information 912 based on the advertising bidding price inputted by the affiliate server 150. As illustrated in FIG. 1, the affiliate server 150 may be implemented in plural. Accordingly, the first to third affiliate servers 151, 152, and 153 may select product advertisements belonging to the same category. In this case, when determining which one is to be advertised among the pieces of selected advertising information of the first to third affiliate servers 151 to 153, the advertising server 130 may consider an advertising bidding price inputted by each affiliate server. For example, the advertising server 130 may select an affiliate server that has inputted the highest advertising bidding price or may select an advertising product having the highest expected profits on the part of a medium.

The text analysis apparatus 140 performs an operation of extracting text-based product attribute values corresponding to the selected advertising information by analyzing text information included in the received selected advertising information (ST 830). The detailed construction and operation of the text analysis apparatus 140 have already been described above with reference to FIGS. 4 to 6, and thus a redundant description thereof is omitted.

Thereafter, the test analysis apparatus 140 provides the text-based product attribute values extracted by the text analysis apparatus 140 to the advertising server 130 (ST 840).

The product attribute value storage unit 630 performs an operation of storing the text-based product attribute values extracted by the text analysis apparatus 140 in the DB 133 of the advertising server 130.

The user terminal 110 may search for a given product through the product search application already installed therein (ST 850). For example, referring to FIG. 9, a user may select QLED TV in a TV category by using the category search function of the product search application (112*a* in FIG. 2) or may directly input "SAMSUNG QLED TV" by using the search keyword input function of the product search application 112*a*.

Furthermore, search for a product according to an embodiment of the present disclosure may be implemented by using an image search function as described above in addition to the category search function or the search keyword search function.

Accordingly, the advertising provision unit 640 of the advertising server 130 may compare a search keyword inputted by a user with the text-based attribute values of the selected products (ST 860). When the search keyword inputted by the user is matched with the attribute values as a result of the comparison, the advertising provision unit 640 may preferentially expose, onto a result display screen of the product search application of the user terminal, product advertising information including the attribute values matched with the search keyword. For example, the advertising provision unit 640 may provide the selected product advertising information to the first page of the result display screen of the product search application of the user terminal 110 (ST 870).

In a conventional common advertising method, the product advertising information 912 selected by the affiliate server 150 may not be preferentially advertised on the search result display screen of the product search application. That is, although the product advertising information 912 cannot be exposed onto the first page of the search result display screen, according to an embodiment of the present disclosure, when a search keyword and/or search category inputted by the user is matched with text-based attribute values of the selected advertising information 912, the product advertising information 912 can be preferentially displayed on the first page of the search result display screen as illustrated in FIG. 9. That is, according to an embodiment of the present disclosure, optimal advertising suitable for the needs of a final consumer can be more efficiently performed by preferentially providing the selected advertising information to the consumer.

Furthermore, the advertising provision unit 640 may determine the advertising order of a plurality of pieces of product advertising information selected by the plurality of affiliate servers 151, 152, and 153 by comparing and analyzing a plurality of advertising bidding prices inputted by the plurality of affiliate servers 151, 152, and 153.

For example, with respect to first product advertising information selected by the first affiliate server 151 and a first advertising bidding price thereof and second product advertising information selected by the second affiliate server 152 and a second advertising bidding price thereof, the following descriptions are made on the assumption that the first product advertising information and the second product advertising information correspond to products belonging to substantially the same category.

First, when the first advertising bidding price inputted by the first affiliate server 151 is higher than the second advertising bidding price inputted by the second affiliate server 152, the advertising server 130 may determine to preferentially advertise the first product advertising information of the first affiliate server 151. In this case, as described above, preferentially advertising may be implemented by exposing the first product advertising information onto the first page of the search result screen with respect to search results of user terminals.

Furthermore, when the number of pieces of product advertising information which may be exposed onto the first page is plural, the order of product advertising information exposed onto the first page may be determined based on the advertising bidding prices. For example, if two pieces of product advertising information can be exposed on a search result screen, the first product advertising information and the second product advertising information may be exposed onto the first page. However, in this case, the first product advertising information having a higher advertising bidding price may be disposed to be preferentially displayed.

Next, when the first advertising bidding price inputted by the first affiliate server 151 is the same as the second advertising bidding price inputted by the second affiliate server 152, an additional criterion is added for determining which product information is to be preferentially advertised. Such a criterion may be set and applied by the advertising server 130. For example, as described above, the advertising server 130 may select an advertising product having the highest expected profits on the part of the advertising server 130, and may preferentially advertise the advertising product. In this case, a method of calculating expected profits for each product may be autonomously implemented by the advertising server 130, and may be stored in the DB 132 of the advertising server 130. Furthermore, the stored method of calculating expected profits may be changed or updated.

As described above, while the present disclosure has been described in conjunction with specific contents such as detailed elements, limited embodiments, and the drawings, the description has been provided to merely help general understanding of the present disclosure, and the present disclosure is not limited to the embodiments. A person having ordinary knowledge in the art to which the present disclosure pertains may change or modify the present disclosure in various ways based on the foregoing description.

Accordingly, the spirit of the present disclosure should not be determined to be limited to the described embodiments, and all changes equivalents to the claims and equivalent modifications thereof should be construed as belonging to the category of the spirit of the present disclosure.

What is claimed is:

1. A system for automatic matching search advertisement based on a product, the system comprising:
    an advertising server configured to be accessible by at least one affiliate server and provide the affiliate server with a product-based automatic matching advertising interface, wherein the product-based automatic matching advertising interface is configured to display pieces of product advertising information stored in a database of the advertising server and receive an advertising bidding price of a selected advertising product corresponding to one of the pieces of the product advertising information;

a text analysis apparatus configured to generate and output one or more product attribute values corresponding to one or more selected pieces of the product advertising information by analyzing text information corresponding to the one or more selected pieces of the product advertising information selected by the affiliate server while operating in conjunction with the advertising server;

at least one user terminal having a product search application provided by the advertising server, the at least one user terminal connected to the advertising server over a network and configured to transmit to advertising server a search keyword or a search image inputted through the product search application of the user terminal, wherein the advertising server is further configured to, if the search keyword or the search image transmitted from the user terminal is matched with the one or more product attribute values corresponding to the product advertising information selected by the affiliated server, provide the user terminal with the product advertising information selected by the affiliated server, and wherein the text analysis apparatus is further configured to:

receive, as metadata, text information corresponding to an image of the one or more selected pieces of the product advertising information;

generate and output the one or more product attribute values corresponding to the one or more selected pieces of the product advertising information by analyzing the metadata by machine learning algorithm execution;

analyze, in a morpheme unit, the text information inputted as the metadata in a form of a sentence or a combination of a plurality of words;

extract, from a plurality of morphemes, pieces of feature information of a product corresponding to a corresponding product image by analyzing the plurality of morphemes; and generate product attribute values corresponding to products by comparing the pieces of feature information of the products with product attribute values previously set and stored in the second database and converting the pieces of feature information into product attribute values matched with the feature information.

2. The system of claim 1, wherein the advertising server is configured to determine whether to advertise the one or more selected pieces of the product advertising information based on the advertising bidding price of the selected advertising product inputted by the at least one affiliate server.

3. The system of claim 2, wherein the at least one affiliate server comprises a plurality of affiliate servers configured to select a plurality of pieces of product advertising information among the pieces of product advertising information stored in the database of the advertising server, and the advertising server is configured to determine an advertising order of the plurality of pieces of product advertising information selected by the plurality of affiliate servers by comparing and analyzing a plurality of advertising bidding prices inputted by the plurality of affiliate servers.

4. The system of claim 3, wherein the plurality of affiliate servers comprises first and second affiliate servers, and the advertising server is configured to:

receive first product advertising information selected by the first affiliate server and a first advertising bidding price of the first product advertising information, and second product advertising information selected by a second affiliate server and a second advertising bidding price of the second product advertising information, and preferentially advertise the first product advertising information of the first affiliate server when the first product advertising information and the second product advertising information correspond to products included in an identical category and the first advertising bidding price of the first product advertising information is higher than the second advertising bidding price of the second product advertising information.

5. The system of claim 1, wherein the advertising server is configured to:

provide the product-based automatic matching advertising interface to the at least one affiliate server;

receive information inputted through the product-based automatic matching advertising interface and provide the received information to the text analysis apparatus;

store, in the database of the advertising server, the product attribute values extracted by the text analysis apparatus; and compare the search keyword inputted through the product search application of the user terminal with the one or more product attribute values of the one or more selected pieces of the product advertising information, and preferentially advertise a piece of the product advertising information corresponding to a product attribute value matched with the inputted search keyword.

6. The system of claim 5, wherein the advertising server is configured to expose the piece of the product advertising information corresponding to the product attribute value matched with the inputted search keyword onto a first page of a search result display screen of the product search application of the user terminal to preferentially advertise the one or more selected pieces of the product advertising information.

7. The automatic matching search advertising system of claim 5, wherein the information inputted through the product-based automatic matching advertising interface comprises the one or more selected pieces of the product advertising information selected by the affiliate server and the advertising bidding price of the selected advertising product corresponding to one of the pieces of the product advertising information.

8. The system of claim 1, wherein the database of the advertising server comprises:

a first database configured to store product images corresponding to the pieces of the product advertising information, and a second database storing attribute values of products corresponding to the product images.

9. The system of claim 1, wherein the text analysis apparatus is further configured to: convert the pieces of the feature information into the product attribute values matched with the feature information by using a synonymous word database for vendor names or product names corresponding to the products and an abbreviation, synonym and conjugation database for the products for each category.

10. A method for automatic matching search advertisement based on a product, the method comprising:
- by an advertising server, providing a product-based automatic matching advertising interface to at least one affiliate server;
- by the advertising server, receiving product advertising information selected by the affiliate server through the product-based automatic matching advertising interface;
- by a text analysis apparatus, receiving, as metadata, text information corresponding to an image of the selected product advertising information and extracting a product attribute value corresponding to the selected product advertising information by analyzing the metadata;
- storing the extracted product attribute value in a database of the advertising server;
- by the advertising server, receiving a search keyword or a search image inputted through a product search application of a user terminal; and
- by the advertising server, comparing the search keyword or the search image received from the user terminal with the product attribute value corresponding to the selected product advertising information and providing the user terminal with the selected product advertising information having a product attribute value matched with the inputted search keyword or the inputted search image to preferentially advertise the selected product advertising information,
- wherein the extracting of the product attribute value corresponding to the selected product advertising information comprises: receiving, as metadata, text information corresponding to an image of the selected product advertising information; and generating and outputting the product attribute value corresponding to the selected product advertising information by analyzing the metadata, and
- wherein the generating and outputting of the product attribute value corresponding to the selected product advertising information by analyzing the metadata comprises: analyzing, in a morpheme unit, pieces of text information inputted as the metadata in a form of a sentence or a combination of a plurality of words; extracting, from a plurality of morphemes, pieces of feature information of a product corresponding to a corresponding product image by analyzing the plurality of morphemes; and generating product attribute values corresponding to products by comparing the pieces of the feature information of the product corresponding to the corresponding product image with product attribute values previously set and stored in the second database and converting the pieces of the feature information into product attribute values matched with the feature information.

11. The method of claim 10, wherein the preferentially advertising of the selected product advertising information comprises exposing the selected product advertising information onto a first page of a search result display screen of the product search application of the user terminal.

12. The method of claim 10, wherein the product-based automatic matching advertising interface displays pieces of product advertising information stored in the database; and
- receives an input of an advertising bidding price of the selected advertising product.

13. The method of claim 12, wherein the information inputted through the product-based automatic matching advertising interface comprises the product advertising information selected by the affiliate server and the advertising bidding price of the selected advertising product.

14. The method of claim 13, further comprising determining whether to advertise the selected product advertising information based on the advertising bidding price of the selected advertising product inputted by the affiliate server.

15. The method of claim 10, wherein the database comprises:
- a first database storing product images of pieces of product advertising information, and
- a second database storing attribute values of products corresponding to images for products.

16. The automatic matching search advertising method of claim 10, wherein the generating of the product attribute values comprises converting the pieces of the feature information into the product attribute values matched with the feature information by using a synonymous word database for vendor names or product names corresponding to the products and an abbreviation, synonym and conjugation database for the products for each category.

17. The method of claim 10, wherein:
- the at least one affiliate server comprises a plurality of affiliate servers, and the method further comprises determining an advertising order of a plurality of pieces of product advertising information selected by the plurality of affiliate servers by comparing and analyzing a plurality of advertising bidding prices inputted by the plurality of affiliate servers.

18. The method of claim 17, wherein:
- the plurality of affiliate servers comprise first and second affiliate servers, and
- the determining of the advertising order of the plurality of pieces of product advertising information comprises:
- receiving first product advertising information selected by the first affiliate server and a first advertising bidding price of the first product advertising information and second product advertising information selected by the second affiliate server and a second advertising bidding price of the second product advertising information, and
- preferentially advertising the first product advertising information of the first affiliate server when the first product advertising information and the second product advertising information correspond to products included in an identical category and the first advertising bidding price is higher than the second advertising bidding price.

* * * * *

UNITED STATES PATENT AND TRADEMARK OFFICE
CERTIFICATE OF CORRECTION

| | | |
|---|---|---|
| PATENT NO. | : 11,941,666 B2 | Page 1 of 1 |
| APPLICATION NO. | : 17/542396 | |
| DATED | : March 26, 2024 | |
| INVENTOR(S) | : Bowoo Choi, Ji Hyun Sung and Kirin Choi | |

It is certified that error appears in the above-identified patent and that said Letters Patent is hereby corrected as shown below:

On the Title Page

Item (54) and in the Specification Column 1 Lines 1-4, in the title, "PRELIMINARY CLASS" should be deleted.

Signed and Sealed this
Second Day of July, 2024

*Katherine Kelly Vidal*

Katherine Kelly Vidal
*Director of the United States Patent and Trademark Office*